Patented July 15, 1924.

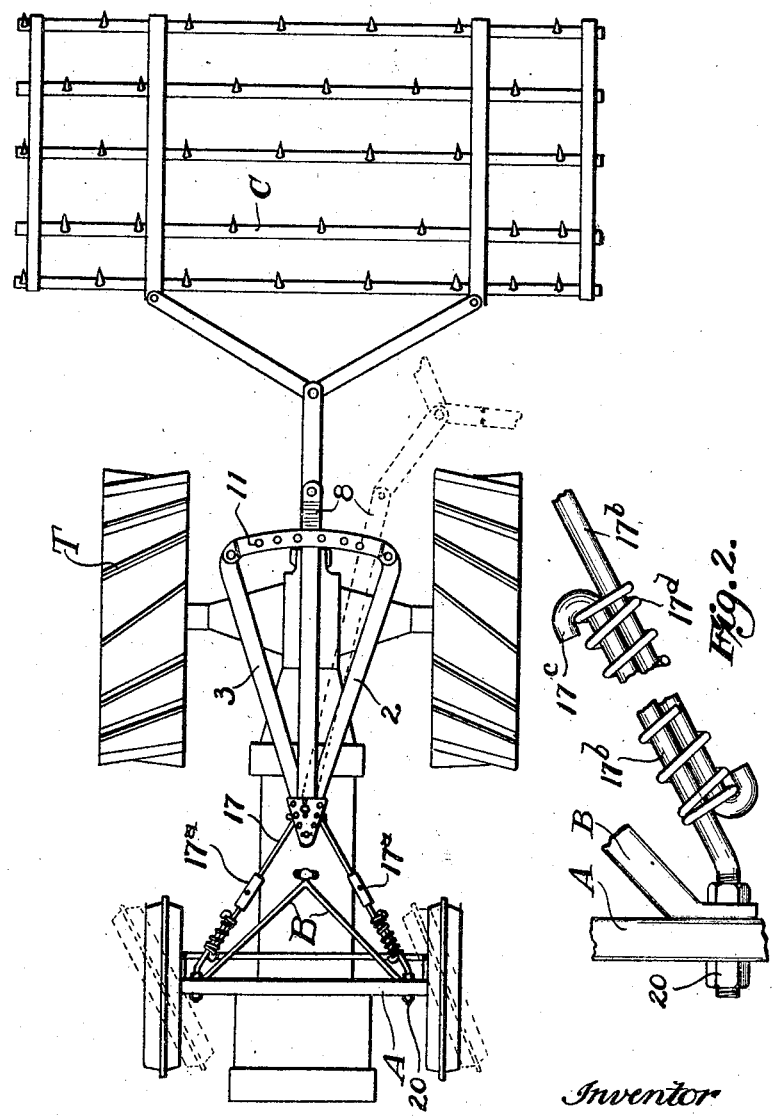

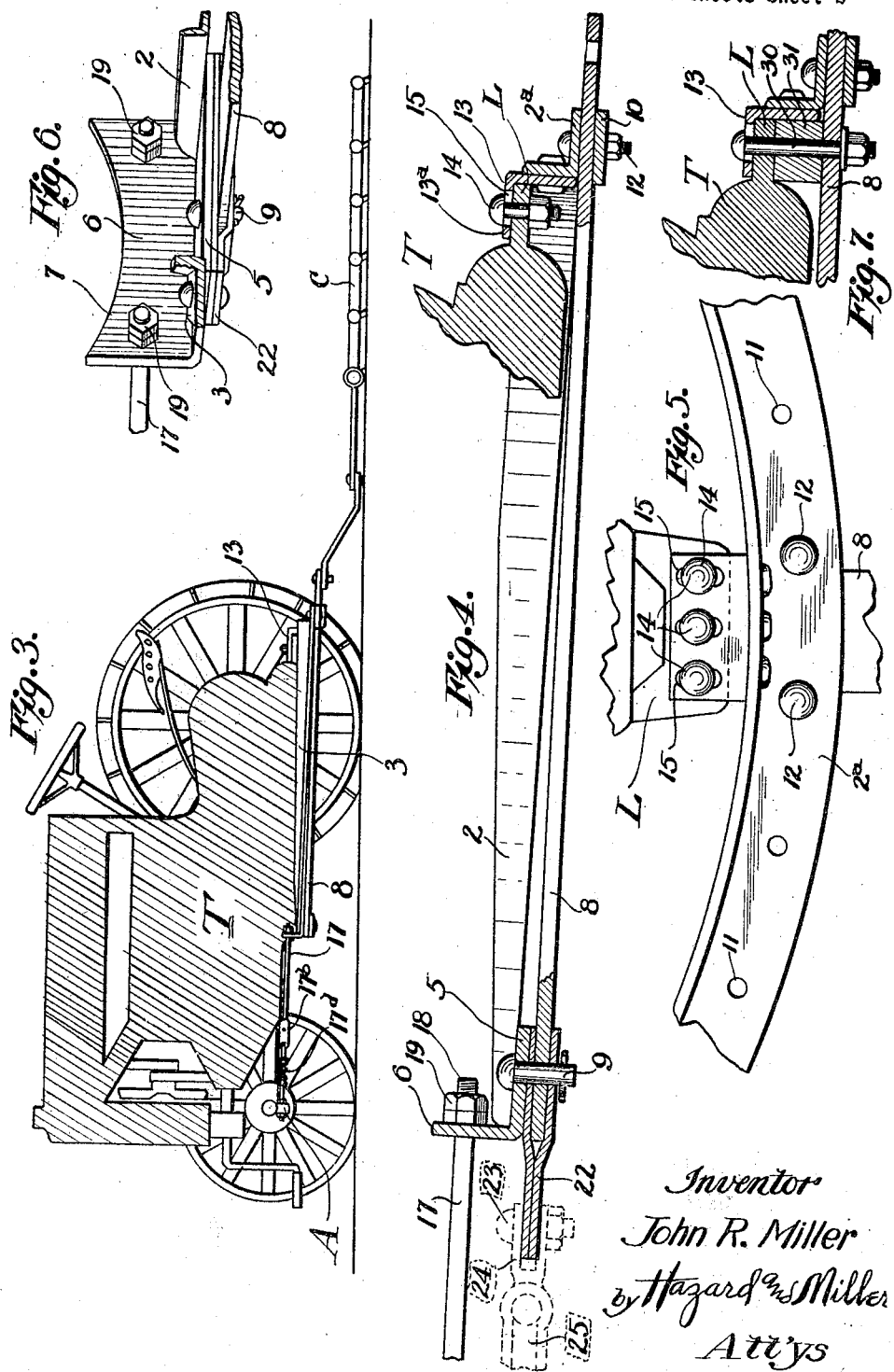

1,501,355

UNITED STATES PATENT OFFICE.

JOHN R. MILLER, OF VAN NUYS, CALIFORNIA.

VEHICLE HITCH.

Application filed February 8, 1923. Serial No. 617,732.

*To all whom it may concern:*

Be it known that I, JOHN R. MILLER, a citizen of the United States, residing at Van Nuys, in the county of Los Angeles and State of California, have invented new and useful Improvements in Vehicle Hitches, of which the following is a specification.

This invention relates to vehicle hitches and has for its object to provide a hitch adapted to be readily attached to tractors in such manner that a portion of the load being drawn by the tractor will be applied directly to the front axle of the vehicle for the purpose of exerting a downward pull upon the front structure of the tractor, and therefore eliminate the tendency of some types of tractors to turn somersault. Another object of the invention is to provide a hitch that may be readily adapted to a single front wheel or multiple front wheel tractor. Another object is to provide a hitch of simple and substantial construction and in which the wearing parts are designed for longevity of service by providing for a large bearing area as between the parts which are subjected to relatively constant sliding action.

Other objects will be made manifest in the following description of the invention, an embodiment of which is illustrated in the accompanying drawings, wherein:

Figure 1 is a bottom plan of a tractor, with which the hitch is combined and shown as attached to an agricultural implement.

Fig. 2 is an enlarged detailed view of the means connecting the hitch to the front axle of the tractor.

Fig. 3 is a side elevation of the tractor, the body thereof being shown in diagrammatic form and with the near wheels removed to clearly illustrate the attached hitch.

Fig. 4 is a detailed sectional view of the frame of the hitch.

Fig. 5 is a plan showing the shackle attachment to engage the usual draft lug of the tractor and for supporting the rear end of the hitch frame.

Fig. 6 is a perspective of the hitch saddle resting below the crank case of the engine.

Fig. 7 is a sectional detail showing means for providing for a direct hitch to the rear hitch lug of the tractor.

The invention as shown comprises a triangular frame, having forwardly convergent side members 2—3, which meet at the forward apex on a saddle member having a bottom flange 5 to which the frame bars 2—3 are secured, and having an upwardly extending flange 6 curved at 7 complementary to the bottom of the crank case of the tractor T. Pivotally secured at its forward end to the saddle plate 5, is a rearwardly extending draft link 8, which passes beneath the transverse frame bar 2ª and rides upon a transverse clevis bar 10, which, with the transverse frame bar 2ª, is curved on an arc concentric with the pivot pin 9 in the saddle. The arcuate bars 2ª—10 are perforated at 11 to receive limiting bolts 12, which are arranged to define the operative position of the draft link 8. Thus the link may be held in central position as shown in full lines in Fig. 1, or the link may be held to either side of the center, as shown by dotted lines, Fig. 1. The limiting bolts 12 may be omitted when desired, so as to permit the short turning of the tractor when drawing vehicles or other objects, as for instance, the cultivator C.

The rear end of the frame is suspended from the rear end of the tractor by means of a clevis hook 13, which is attached to the frame member 2ª, and has a flange 13ª overhanging the draft lug L of the tractor. The hitch hook 13 may be attached loosely or solidly by bolts 14 which pass through forwardly and rearwardly, extending slots 15 in the flange 13ª. This construction provides, therefore, for the positive hitching of the draft means to the draft lug L, or for a loose attachment thereto, as may be desired.

Extending forwardly from the saddle flange 6 is a pair of hitching links 17, the rear ends of which are threaded at 18 to receive lock nuts 19, and the forward ends of the hitching links 17 pass through the front axle A and are fastened by lock nuts 20 on each side of the axle. The usual brace members B are retained for bracing the axle A; the links B being connected to the bottom of the crank case as shown in Fig. 1.

For adapting the hitch to a single front wheel type of tractor, the front portion of the hitch frame is provided with a clevis plate 22, perforated to receive a fastening bolt 23 of a universal joint connection 24, to which a single center hitch link 25, shown in dotted lines in Fig. 4, may be attached. In such form of attachment the divergent hitch links 17 are omitted. These hitch links are provided with respective turnbuckles 17ª, whereby, when the fastening bolts 14 of the clevis hook 13 are released, then the tension of the draft will be transmitted through the frame to the front axle and this will exert downpull on the tractor hitch lug L. By adjusting the turnbuckle 17ª, the hitch hook 13 can be positioned tight against the hitch lug L, and when the bolt 14 is set up tight, it will be seen that the load will be carried by the hitch lug.

The draft link 8 has a wide bearing surface on the saddle or riding bar 10, and this provides for a long life of service as between these parts.

Preferably, the links 17 are of elastic construction and are shown as having sections 17ᵇ each with hooks 17ᶜ, and between these hooks is compressed an expansion spring 17ᵈ which, therefore, allows for a desired degree of elongation of the links.

In cases where it is desired to make a hitch on the hitch lug L, this is accomplished by passing a bolt 30 through the contiguous portion of the link 8 and through the lug. A spacing or filler block 31 is provided between the hitch lug L and the link 8 to provide for a substantial connection and enable the proper tightening up of the parts when the hitch is made to the lug.

Various modifications may be resorted to within the scope of the appended claims.

What is claimed is:

1. A draft hitch for tractors, comprising a frame having arcuate transverse rear end members, means for attaching the said members to the usual draft lug of the tractor, elastic means at the forward end of the frame for connecting it to the tractor front axle, and a draft link pivotally connected to the front end of the frame and adapted for lateral adjustment and sliding action between the rear members of the frame.

2. A draft hitch for tractors, comprising a frame adapted to be arranged below the power plant of the tractor and having a triangular form converging forwardly, a saddle member at the forward end of the frame, disposed below the crank case of the engine said member being curved to fit the bottom of the crank case and adapted to prevent sidewise movement of the saddle member, elastic means for connecting the forward end of the frame to the front axle of the tractor, the frame having spaced arcuate, transverse, rear members, a draft link pivoted in the front end of the frame and sliding between said members, a means for attaching the rear end of the frame to the usual hitch lug of the tractor and allowing longitudinal movement under tension of the elastic means.

3. A draft hitch for tractors, comprising a frame adapted to be arranged below the power plant of the tractor and having a triangular form converging forwardly, a saddle member at the forward end of the frame, disposed below the crank case of the engine, said member being curved to fit the bottom of the crank case and adapted to prevent sidewise movement of the saddle member, elastic means for connecting the forward end of the frame to the front axle of the tractor, the frame having spaced arcuate, transverse, rear members, a draft link pivoted in the front end of the frame and sliding between said members, and means for slidingly attaching the rear end of the frame to the usual hitch lug of the tractor.

4. A draft hitch for tractors, comprising a frame adapted to be arranged below the power plant of the tractor and having a triangular form converging forwardly, a saddle member at the forward end of the frame, disposed below the crank case of the engine, adjustable means for connecting the forward end of the frame to the front axle of the tractor, the frame having spaced arcuate, transverse, rear members, a draft link pivoted in the front end of the frame and sliding between said members, a means for attaching the rear end of the frame to the usual hitch lug of the tractor, the saddle member having an upstanding flange portion with a curved edge to bear against the bottom of the crank case.

5. A draft hitch for tractors, comprising a triangular frame, having transverse superposed clevis members, means for slidingly connecting the rear end of the frame to the usual draft lug of the tractor, a draft link pivoted at the forward, convergent end of the said frame and passing rearwardly between said superposed members, and an adjustable elastic link means at the forward end of the said frame for attaching it to the vehicle front axle.

6. A draft hitch for tractors, comprising a triangular frame having forwardly convergent and meeting side members, a saddle member having a bottom flange to which the meeting ends of the triangular frame are attached and having an upwardly extending flange with its upper edge curved to fit the bottom of a crank case, a rearwardly extending draft link pivotally secured to the saddle member and passing beneath the triangular frame and beyond the frame, a transverse clevis bar connecting the rear ends of the triangular frame and passing under the draft link, a second transverse clevis bar connecting the triangular frame and passing above the draft link, said transverse clevis bars being curved to an arc concentric to the pivot pin at the forward end of the draft link, and said clevis bars having a plurality of perforations to receive bolts to hold the draft link in a desired position and to be removed to allow the draft link to swing, a clevis hook attached to the upper transverse clevis bar and having a flange riding upon the draft lug of the tractor, bolts securing the flange to the draft lug and which may be removed to allow the draft lug to run loose, a pair of hitching links connected to the upstanding part of the saddle flange, said links being adapted to pass through the front axle of the tractor and be held by nuts.

In testimony whereof I have signed my name to this specification.

J. R. MILLER.